(12) United States Patent
Lee et al.

(10) Patent No.: US 8,597,607 B2
(45) Date of Patent: Dec. 3, 2013

(54) METHOD FOR PREPARING GRAPHENE RIBBONS

(75) Inventors: Jae-Kap Lee, Seoul (KR); So-Hyung Lee, Seoul (KR); Wook-Seong Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1001 days.

(21) Appl. No.: 12/545,740

(22) Filed: Aug. 21, 2009

(65) Prior Publication Data
US 2010/0047154 A1   Feb. 25, 2010

(30) Foreign Application Priority Data
Aug. 22, 2008   (KR) ........................ 10-2008-0082512

(51) Int. Cl.
*C09C 1/44* (2006.01)
(52) U.S. Cl.
USPC ......... 423/460; 423/447.1; 977/742; 977/842
(58) Field of Classification Search
USPC ............... 423/448, 460, 445 B, 447.1, 447.2; 977/842, 846, 847
See application file for complete search history.

(56) References Cited

PUBLICATIONS

Kosynkin et al., "Longitudinal unzipping of carbon nanotubes to form graphene nanoribbons," Apr. 16, 2009, Nature Letters, vol. 458, pp. 872-877.*
Li et al., "Chemically Derived, Ultrasmooth Graphene Nanoribbon Semiconductors," 2008, Science, vol. 319, pp. 1229-1232.*
Han et al., "Energy Band-Gap Engineering of Graphene Nanoribbons," 2007, Physical Review Letters, 98, pp. 206805-1-206805-4.*
Nakada et al., "Edge state in graphene ribbons: Nanometer size effect and edge shape dependence," 1996, Physical Review B, vol. 54, No. 24, pp. 17954-17961.*
Campos-Delgado et al., "Bulk Production of a New Form of sp2 Carbon: Crystalline Graphene Nanoribbons," 2008, Nano Letters, vol. 8, No. 9, pp. 2773-2778.*
Shyu et al., "Electronic properties of AA-stacked nanographite ribbons," 2003, Physica E, 16, pp. 214-222.*
Kiselev et al., "Carbon micro- and nanotubes synthesized by PE-CVD technique: Tube structure and catalytic particles crystallography," 2004, Carbon, 42, pp. 149-161.*
Sergiienko et al., "Nanographite structures formed during annealing of disordered carbon containing finely-dispersed carbon nanocapsules with iron carbide cores," 2009, Carbon, 47, pp. 1056-1065.*
Cappelli et al., "Nano-structured oriented carbon films grown by PLD and CVD methods," 2004, Applied Physics A, 79, pp. 2063-2068.*
Saveliev et al., "Metal catalyzed synthesis of carbon nanostructures in an opposed flow methane oxygen flame," 2003, Combustion and Flame, 135, pp. 27-33.*
Amelinckx et al., "A Formation Mechanism for Catalytically Grown Helix-Shaped Graphite Nanotubes," 1994, Science, vol. 265, pp. 635-639.*

(Continued)

*Primary Examiner* — Daniel C McCracken
(74) *Attorney, Agent, or Firm* — Morrison & Foerster LLP

(57) ABSTRACT

Disclosed is a method for fabricating graphene ribbons, comprising: preparing a graphitic material comprising stacked graphene helices; and cutting the graphitic material in a short form by applying energy to the graphitic material; and simultaneously or afterward, decomposing the graphitic material into short graphene ribbons. This method provides a mass production route to graphene ribbons.

6 Claims, 6 Drawing Sheets

(56) References Cited

PUBLICATIONS

Koga et al., "Formation of Ordered Ice Nanotubes Inside Carbon Nanotubes," 2001, Nature, 412, pp. 802-805.*

Enoki et al., "Magnetic nanographite: an approach to molecular magnetism," 2005, Journal of Materials Chemistry, 15, pp. 3999-4002.*

Byl et al., "Unusual Hydrogen Bonding in Water-Filled Carbon Nanotubes," 2006, J. Am. Chem. Soc., 128, pp. 12090-12097.*

Gogotsi et al., "In situ multiphase fluid experiments in hydrothermal carbon nanotubes," 2001, Applied Physics Letters, vol. 79, No. 7, pp. 1021-1023.*

Takaiwa et al., "Phase diagram of water in carbon nanotubes," 2008, PNAS, vol. 105, No. 1, pp. 39-43.*

Hennrich et al., "Diameter sorting of carbon nanotubes by gradient centrifugation: role of endohedral water," Nov. 2007, physica status solidi (b), vol. 244, Issue 11, pp. 3896-3900.*

Lachter and Bragg, Physical Review B (1986) 33(12):8903-8905.

Wang and Wei, Carbon (2003) 41:2939-2948.

Chen et al., Materials Letter (2006) 60:241-244.

Gu et al., Nano Letter (2002) 2:1009.

Konya et al., Carbon (2004) 42:2001-2008.

Pierard et al., Chemical Physics Letters (2001) 335:1-8.

* cited by examiner

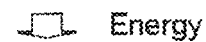 Energy

AA stacking

METHOD FOR PREPARING GRAPHENE RIBBONS

CROSS-REFERENCE TO RELATED APPLICATIONS

The present disclosure relates to subject matter contained in priority Korean Application No. 10-2008-0082512, filed on Aug. 22, 2008, which is herein expressly incorporated by reference in its entirety.

BACKGROUND OF THE INVENTION

1. Field of the Invention

The present invention relates to a method for preparing graphene ribbons, and particularly, to a method for fabrication of graphene in the form of a ribbon.

2. Background of the Invention

Graphene, a single layer trigonal carbon honeycomb with a thickness of about 4 Å (refer to FIGS. 1 (A) and 1 (B)), has enormous industrial potential due to its outstanding physical properties compared to, among others, in particular single-wall carbon nanotubes. Graphene is the basic unit of $C_{60}$, multi-walled carbon nanotubes (MW CNTs), and graphite.

The two-dimensional, single layer graphene material is obtainable when the weak van der Waals forces between graphene planes are disrupted. Micromechanical cleavage is the most assured method for fabricating graphene, but the yield is too low. The yield of pure graphene by a chemical route, which has been proposed as a mass production method, is also as low as around 0.5%. Graphene formed on a metal substrate by chemical vapour deposition (CVD) methods produce mostly multiple-layer graphene materials.

On the other hand, there have been efforts to prepare short carbon nanotubes by cutting multi-walled carbon nanotubes (known as a non-crystalline turbostratic structure, refer to FIG. 2) by a mechanical method, such as ball milling, or a chemical method (refer to L. Chen et al., [Materials Letter 60 (2006) 241-244], N. Pierard et al., [Chemical Physics Letters 335 (2001) 1-8], Z. Konya et al., [Carbon 42 (2004) 2001-2008], and Z. Gu et al., [Nano Letter 2 (2002) 1009]). However, graphene could not be obtained by such efforts.

SUMMARY OF THE INVENTION

Therefore, an object of the present invention is to provide a route for mass production of graphene ribbons, thus opening up industrial applications utilizing large scale amounts, i.e., tons per year, of this innovative carbon material.

To achieve these and other advantages and in accordance with the purpose of the present invention, as embodied and broadly described herein, there is provided a method for preparing graphene ribbons, comprising crumbling the graphitic materials composed of long graphene helices (several micrometers in length) (refer to FIG. 3) into short graphene ribbons (up to about 50 nm in length) by applying energy (refer to FIG. 4 (A)-(D)). The graphene ribbon based materials are stacked in AA' (refer to FIGS. 3 and 5) or turbostratic (refer to FIG. 2) arrangements, in which the interlayer bond force is weaker than that of an AB structure (refer to FIGS. 1 (A) and 1 (B)). This development provides a route for large-scale production route to graphene ribbons, thus opening up large-scale industrial applications, i.e., tons per year, of this innovative carbon.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

A method for preparing graphene ribbons according to the present invention comprises (1) preparing graphite composed of helically stacked graphene ribbons, (2) cutting the graphitic material into a short form by applying energy to the graphitic material and (3) either simultaneously or immediately afterward, decomposing an interlayer bond force thereby splitting the graphitic material into short graphene ribbon.

Hereinafter, the respective steps will be explained in more detail with reference to the attached drawings.

Preparation of the Graphitic Material

Figure 3:
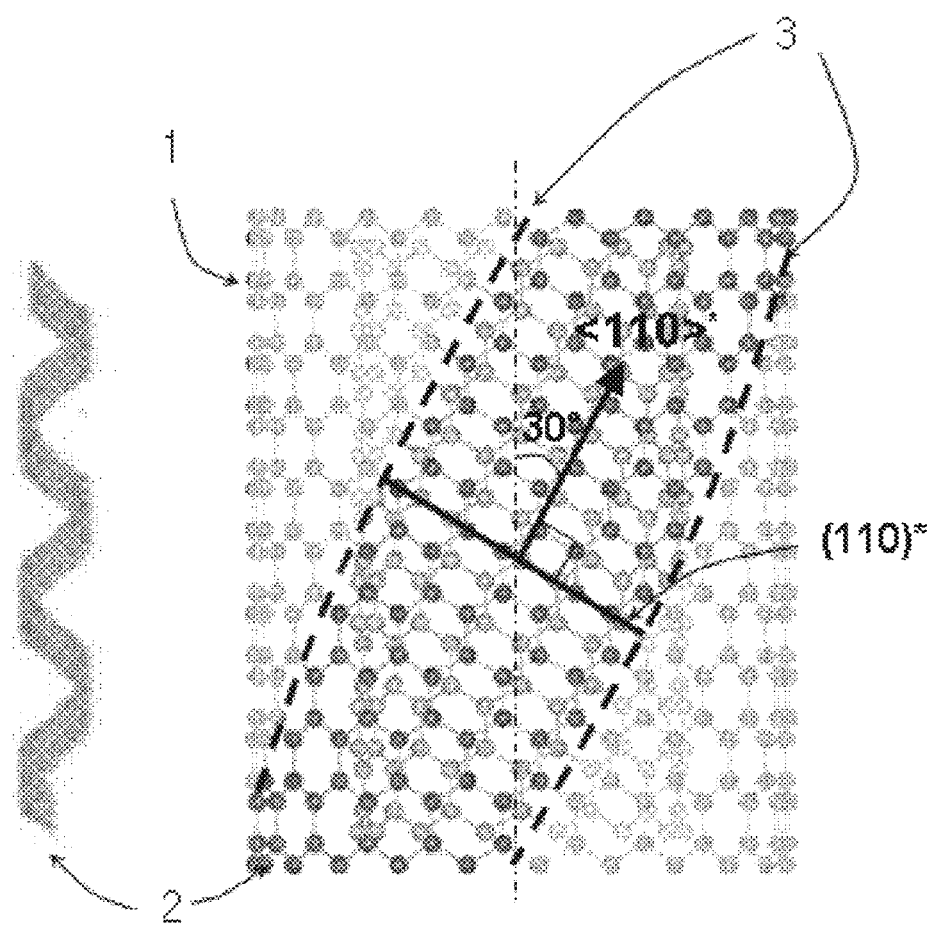
FIG. 3 is a schematic diagram showing a tubular graphitic material comprising AA' stacked graphene helices.
Figure 4:
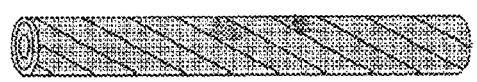
FIG. 4 (A)-(D) are schematic diagrams showing processes for preparing graphene ribbons according to an embodiment of the present invention.
Figure 4:
Figure 4:
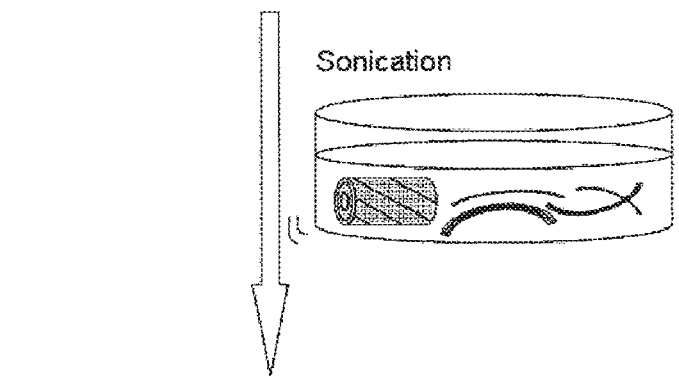
Figure 4:

Graphitic material 1 (FIG. 3) according to the present invention has a structure of graphene ribbons 2 (FIG. 3) that have been helically grown along a long axis (see also FIG. 4 (A)). Here, the graphitic material has a structure of at least two long-ribbons stacked together.

Referring to FIG. 3, the graphitic material 1 is composed of helically grown long-ribbon shaped graphene formed by dislocation 3. The graphitic material 1 has a high aspect ratio of greater than 10, a diameter of a few nm to several hundred nm (e.g., 2 to 300 nm) and a length of several μm. The graphene ribbons 2 constituting the graphitic material have a width of several tens of nm (generally, less than about ¼ of the diameters of the raw material, or ½ of the diameters of the graphitic material when it does not have a complete tubular shape), and have a length corresponding to that of the graphitic material.

The graphitic material may have a tubular or a fibrous shape. However, the present invention is not limited to those shapes.

Figure 5:
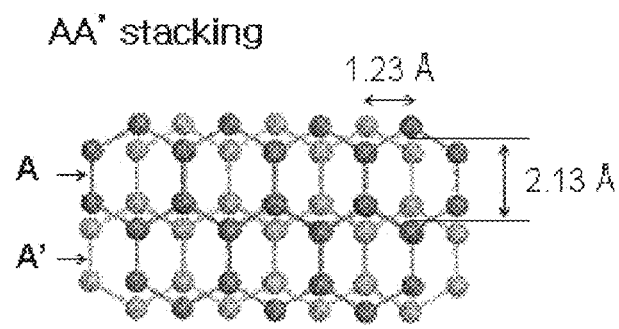
FIG. 5 is a planar view of AA' graphite showing the feature of the AA' stacking of graphene layers.

The stacking type of graphene ribbons in the graphitic material may either be a turbostratic (refer to FIG. 2) or an AA' structure. The turbostratic structure indicates the disordered stacking of graphene (i.e., there is no regularity in stacking between graphene layers). And, as shown in FIGS. 3 and 5, the AA' stacked structure is a structure in which alternating graphene layers are translated by a half hexagon (1.23 Å).

The AA' stacked structure is comparable with AB stacked structure (AB stacked graphite) known as the only crystalline graphite, and an AA stacked structure (AA stacked graphite) that can not energetically exist in nature but can be formed by intercalation with Li between graphene layers.

AB stacked graphite is described by a space group of a hexagonal (#194), in which a=b=2.46 Å, c=6.70 Å, α=β=90°, and γ=120°. AB graphite has an interplanar spacing of 3.35 Å, i.e., ½ of c.

Figure 1:
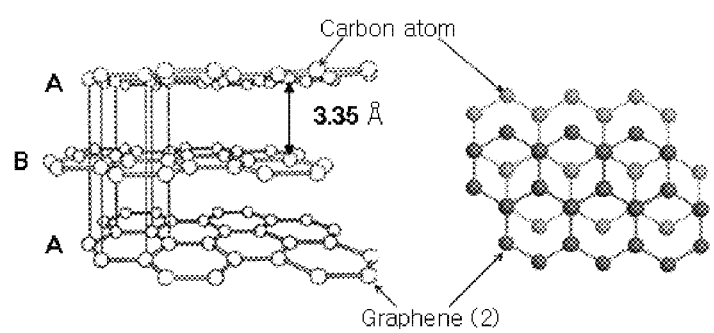
FIG. 1 (A) is a schematic diagram of graphite with an AB stacked structure, and FIG. 1 (B) is a planar view of AB graphite showing the feature of the AB stacking of graphene layers.
Figure 2:
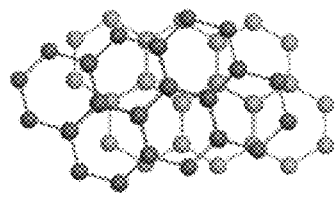
FIG. 2 is a planar view of turbostratic graphite showing the feature of the disordered turbostratic stacking of graphene layers.

AA stacked graphite is described by a space group of a simple hexagonal (#191), in which a=b=2.46 Å, c=3.55 Å, α=β=90°, and γ=120° (refer to FIG. 2). AA stacked graphite has an interplanar spacing of 3.55 Å.

Figure 6:
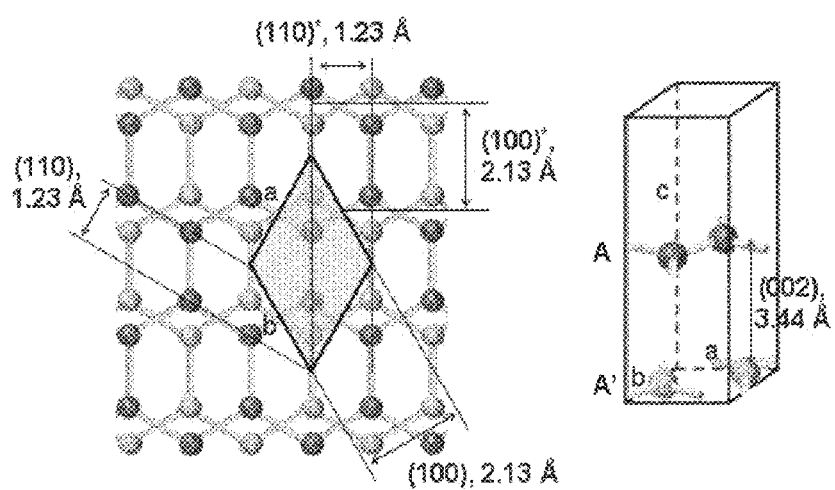
FIG. 6 (A) is a planar view showing the crystal structure of AA' graphite, and FIG. 6 (B) is a schematic diagram showing a space group of the AA' crystal.
Figure 7:
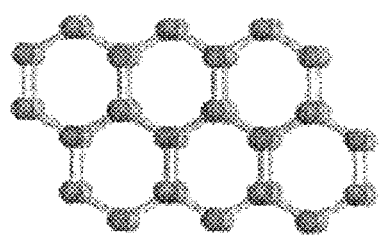
FIG. 7 is a planar view of AA graphite showing the feature of the AA stacking of graphene layers.

The structure of AA' stacked graphite of the present invention could not be described with any of the 230 crystal space groups. Thus, the crystal structure of AA' graphite was assigned to a simple hexagonal space group. Four atoms, consisting of two atoms on each of the A and A' layers, are contained within the primitive unit cell of AA' graphite. The former two atoms at (⅓, ⅔, ½), (⅔, ⅓, ½) are linked to the 2(d) site (⅓, ⅔, ½) of the space group whereas the latter two atoms at (⅙, ⅚, 0), (⅚, ⅙, 0) cannot be defined in the space group. Two kinds of both the (100) and the (110) planes appear, and these distinctive planes were designated as (100)* and (110)*, respectively. Due to a lack of experimental data concerning the atomic positions within the space group, the X-ray diffraction (XRD) pattern of AA' graphite was derived from that of AA graphite and it can be also derived from other space groups, particularly orthorhombic or monoclinic space group. The (001), (100), (102), (002), (014), (110), (112), (006), (200) and (022) peaks appear in the pattern of AA graphite. The (h0l), (0kl) and (hkl) reflections are absent in AA' graphite, due to the insertion of additional atoms from the A' graphene layers into the eclipsed AA form. As a result the available reflections for AA' graphite are due to the (002), (100), (004), (110), (006) and (200) planes, where the intensity of the (110) plane, that is (110)*, should be stronger due to the periodic overlap of graphene layers, as shown in FIG. 6A ((006) (2θ=84.4°) and (200) (2θ=92.6°) peaks are normally not observed because their intensities are too weak). One outstanding feature of the pattern of AA' graphite is the disappearance of the (101) peak (2 θ=44.6°), the (102) peak (2 θ=50.4°) and the (112) peak (2 θ=83.4°); the intensities of these peaks are relatively strong within the pattern of AB graphite. Thus, the absence of the (101), (102) and (112) peaks within the XRD patterns of graphitic materials is a criterion for AA' graphite.

The graphitic material comprising graphene ribbons of the present invention is generally obtainable with CVD (chemical vapour deposition) processes, using hydrocarbon gases such as $C_2H_2$, $C_2H_4$, or $CH_4$ as a source of carbon under a vacuum state (below 760 Torr). Deposition temperatures are normally lower than 1000° C. Particularly, plasma assisted CVD processes can synthesize the graphitic material even at a low temperature of about 500 to about 700° C.

Preparation of Graphene Ribbons

The graphitic material comprising graphene ribbons (FIG. 4(A)) prepared in the first stage is decomposed into shorter graphene ribbons by applying energy to the graphitic material (refer to FIG. 4 (A)-(D)). For instance, mechanical cutting of the graphitic material having a large aspect ratio into a length less than a predetermined length (about several hundred nm) can decompose the graphitic material into graphene ribbons (FIG. 4(B)) because the binding energy between graphene layers (Van der Waals bond) is weak. This is the same principle by which straw bundles are decomposed into straws when the straw bundles are cut into a short length.

Methods for cutting the graphitic material may include a mechanical method (ball milling), a chemical method, and an electrical method (ionic milling utilizing plasma). As the mechanical method of the present invention, a two-roller milling method, a ball milling method, an ultra high pressure spraying method, or other methods may be used.

Mechanical ball milling is a typical method for fabricating graphene ribbons from a tubular graphitic material comprising AA' stacked graphene ribbons (similar to conventional multi-walled carbon nanotubes (MW CNTS)). The milling time needed to decompose the material into graphene ribbons depends on the amount of milling energy used. For example, efficient milling equipment, such as a Spex® milling apparatus, may completely decompose the graphitic material into short graphene ribbons within several hours. However, the graphitic material may not be completely decomposed by a longer milling time, even up to 100 hours, if a small milling energy is used.

When tubular graphite is used as the starting material, a process for crumbling the graphitic tube by inducing a stress (stress crumbling) can be further included. The stress crumbling process is performed by penetrating water into the tubular graphitic material and then freezing it, thereby creating a tensile stress in the tube due to a volume expansion. The tensile stress in turn breaks down the material into graphene ribbons (or powder). Here, an additional treatment for the tubular material to alter its hydrophobic characteristic to hydrophilic characteristic may be required.

Preferably, a sonication process after the crumbling process (by the ball milling or the stress crumbling) can be added to completely scatter the crumbled graphene ribbons in a liquid phase (refer to FIG. 4 (C)).

Preferred Embodiment 1

Graphene ribbons were prepared by using a graphitic nanomaterial in which graphene helices are stacked in an AA' manner (similar to MW CNTs). Here, the graphite nano material has an average outer diameter of 20 nm (outer diameter distribution: 2 to 50 nm), an average inner diameter of 3 to 5 nm (inner diameter distribution: 1 to 10 nm), and a length of 2 to 3 μm. The sample was passed through a two-roller mill 50 times. This process shortened it into short materials of up to about 200 nm in length. Then, the processed sample was made to undergo a hydrophilic treatment, and then was immersed in water to allow water to penetrate the tube. Then, the short, water containing tubules were maintained at a temperature −10° C. for one hour, and then were melted. After sonication (in alcohol) for 10 minutes, graphene ribbons were obtained having a width of about 5 nm and a length of about 200 nm (thickness of about 4 Å).

Preferred Embodiment 2

The same tube-type of graphitic nano material as that of the preferred embodiment 1 was passed through a two-roller mill 100 times, thereby decreasing the length to about 100 nm or less. Then, the sample was made to undergo a sonication process to be dried, whereby graphene ribbons having a width of up to about 5 nm and a length of up to about 100 nm were obtained.

Preferred Embodiment 3

Figure 8:
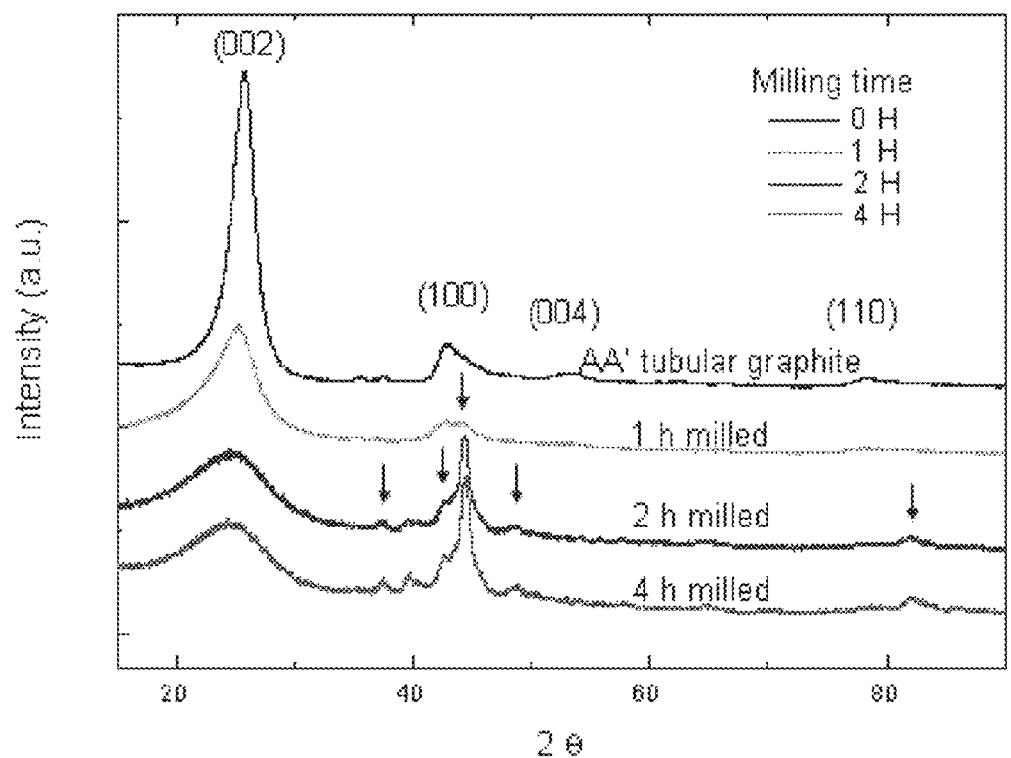
FIG. 8 shows XRD patterns for samples with milling. Characteristic (002), (100), (004), and (110) peaks for AA' graphite were gradually broadened with milling The arrowed peaks could be assigned to metal impurities originated from the steel balls.
Figure 9:
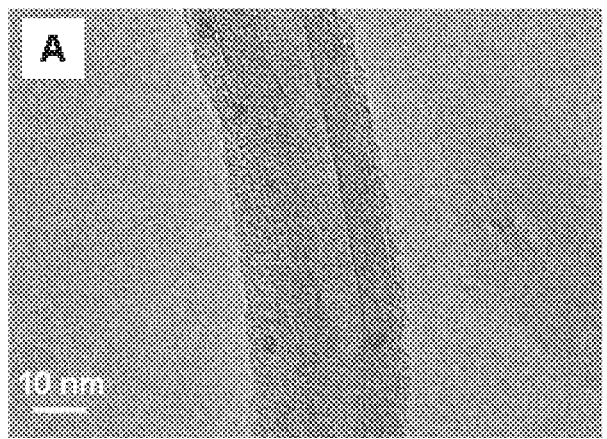
FIG. 9 (A)-(C) shows transmission electron microscope (TEM) images for pristine materials (A) and the samples milled for 1 hour (B) and 2 hours (C). The tubular AA' stacked graphitic material (A) was totally destroyed after Spex® milling (C) for two hours to produce the graphitic ribbons with a thickness of up to about 5 nm (B).
Figure 9:
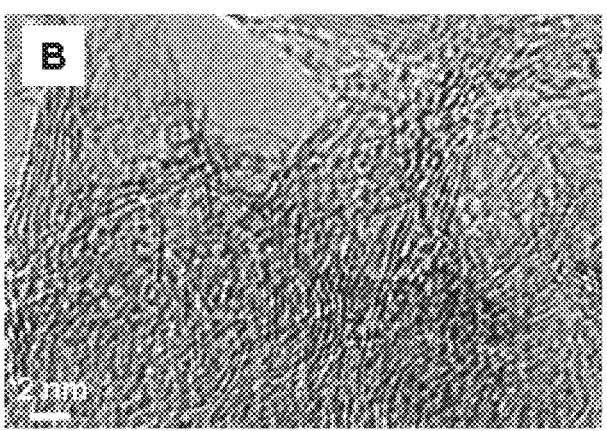
Figure 9:
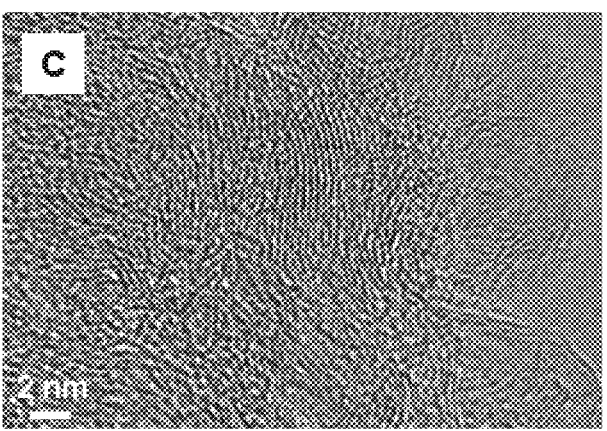

The same graphite nano material as that of the preferred embodiment 1 was milled for two hours in a Spex® ball milling apparatus. Analysis of the milled sample by scanning electron microscopy (SEM) showed no tubular materials. X-ray analysis showed that the characteristic peaks of (002), (100), (004), and (110) of the AA' stacked crystal gradually disappeared as the milling time increased (refer to FIG. 8). This means that the tube-type of AA' graphene stacked body has been decomposed into graphene ribbons (C) via stacked graphene ribbons (B) with the milling time as shown in FIG. 9 (A)-(C). After one hour of milling time, graphitic ribbons coexisted with bi- or single-layer graphene (B). With a further one hour of milling time, the graphitic ribbons were converted to graphene nanoribbons, which are approximately 10 nm in length (C). Stacked graphene fringes are partially observed. Their average interplanar distance was measured to be about 3.55 Å (C). This supports the analysis that the graphene nanoribbons are stacked in a disordered arrangement, i.e., commonly named turbostratic stacking.

Preferred Embodiment 4

Graphene ribbons were prepared by using carbon nano fiber composed of helical graphene (average diameter of 500 nm and length of about 10 μm). The sample underwent a milling process for two hours. As shown in the SEM and X-ray analysis results of the sample, the same results as those of the preferred embodiment 2 were obtained. This shows that carbon nano fiber can be also decomposed into graphene by a milling process like the multi-walled carbon nanotubes.

Preferred Embodiment 5

The same tubular graphitic nanomaterial as that of the preferred embodiment 1 was prepared. To decompose the sample into graphene ribbons by an electric (plasma) energy, the sample was irradiated by a 200 W argon plasma for 10 minutes. The plasma was generated in a pressure of 50 mTorr. Analysis by Atomic Force Microscopy (AFM) revealed decomposed graphene ribbons with a width of 2-6 nm and a length of 5-50 nm-(thickness: 0.4-1 nm).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for preparing graphene ribbons, comprising:
   (a) preparing a graphitic material, wherein the graphitic material is composed of stacked graphene helices, wherein each of the stacked graphene helices is grown along its long axis; and
   (b) (1) shortening the graphitic material by applying an energy, and (2) simultaneously with or subsequent to step (1), decomposing the shortened graphitic material into product graphene ribbons,
   wherein the graphitic material of step (a) has a turbostratic stacked structure or an AA' stacked structure,
   wherein the AA' stacked structure is a graphitic structure comprising alternate graphene layers that are translated by a half hexagon relative to an AA stacked structure.

2. The method of claim 1, wherein the graphitic material has an aspect ratio more than 10 and an outer diameter of 2 to 300 nm, and the product graphene ribbons of step (b) have a width equal to the outer diameter of the graphitic material or less than ½ of the outer diameter of the graphitic material.

3. The method of claim 1, wherein the graphitic material is a tube shape or a fibrous shape.

4. The method of claim 1, wherein the graphitic material of step (a) is a tube shape, and wherein the decomposing step (b)(2) comprises:
   performing a hydrophilic treatment on the shortened tube-shaped graphitic material to increase its hydrophilicity,
   introducing water into the hydrophilic treated graphitic material, and
   freezing the water introduced into the graphitic material to induce a tensile stress in the graphitic material.

5. The method of claim 4,
   wherein step (b) further comprises a sonication process to scatter the product graphene ribbons.

6. The method of claim 1, step (b) further comprises a sonication process to scatter the product graphene ribbons.

* * * * *